United States Patent
Grady

[11] 3,737,269
[45] June 5, 1973

[54] CUTTING APPARATUS FOR EXTRUDED MATERIAL

[75] Inventor: Francis J. Grady, Reading, Pa.

[73] Assignee: Unex Machine & Tool Co., Inc., Reading, Pa.

[22] Filed: Aug. 23, 1971

[21] Appl. No.: 173,972

[52] U.S. Cl. .................425/196, 146/151, 425/311, 425/313, 425/464
[51] Int. Cl. ........................B29c 17/16, B29f 3/04
[58] Field of Search..................425/311, 310, 382, 425/461, 464, 376, 313; 146/151, 156

[56] References Cited

UNITED STATES PATENTS

| | | | |
|---|---|---|---|
| 2,875,728 | 3/1959 | Kasak | 425/464 X |
| 2,891,277 | 6/1959 | Sutor | 425/464 |
| 3,667,886 | 6/1972 | Gauthier et al. | 425/382 X |
| 2,090,095 | 8/1937 | Bainbridge | 425/311 |
| 3,064,589 | 11/1962 | Genich | 425/311 |
| 911,951 | 2/1909 | Tucker | 425/311 |
| 2,838,012 | 6/1958 | Weidenmiller et al. | 425/311 |
| 3,415,206 | 12/1968 | Reisman | 425/190 X |
| 3,337,913 | 8/1967 | List | 425/313 |
| 2,653,530 | 9/1953 | Piperoux | 425/313 |

*Primary Examiner*—J. Spencer Overholser
*Assistant Examiner*—David S. Safran
*Attorney*—Andrew R. Klein, Raymond H. Synnestvedt, William H. Elliott, Jr. et al.

[57] ABSTRACT

A machine for extruding an extrudable material, such as a food product dough, through a plurality of dies having die openings of a desired configuration and for slicing off the extruded material by means of a plurality of reciprocatory cutting blades, one for each die, the blades being adapted to move across and in contact with the lower faces of the dies in a cutting stroke. To ensure severing of the extruded material at high speeds and without distortion of the configuration thereof, the lower face of each die is convex in a transverse direction, the blade consists of a thin, flexible strip having a sharp cutting edge, and the blade is mounted in such a manner that it is held under tension, the mounting means including means for adjusting the position of the blade relative to the lower face of its associated due to maintain it in contact with such die face during the cutting stroke. A typical field of use of the machine is in the production of pretzels from pretzel dough.

12 Claims, 6 Drawing Figures

PATENTED JUN 5 1973

INVENTOR
FRANCIS J. GRADY

BY *Symmestvedt & Lechner*

ATTORNEYS

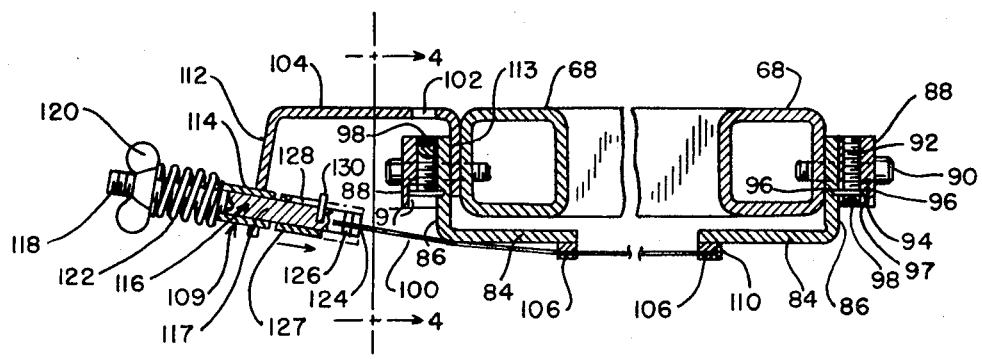
FIG. 3
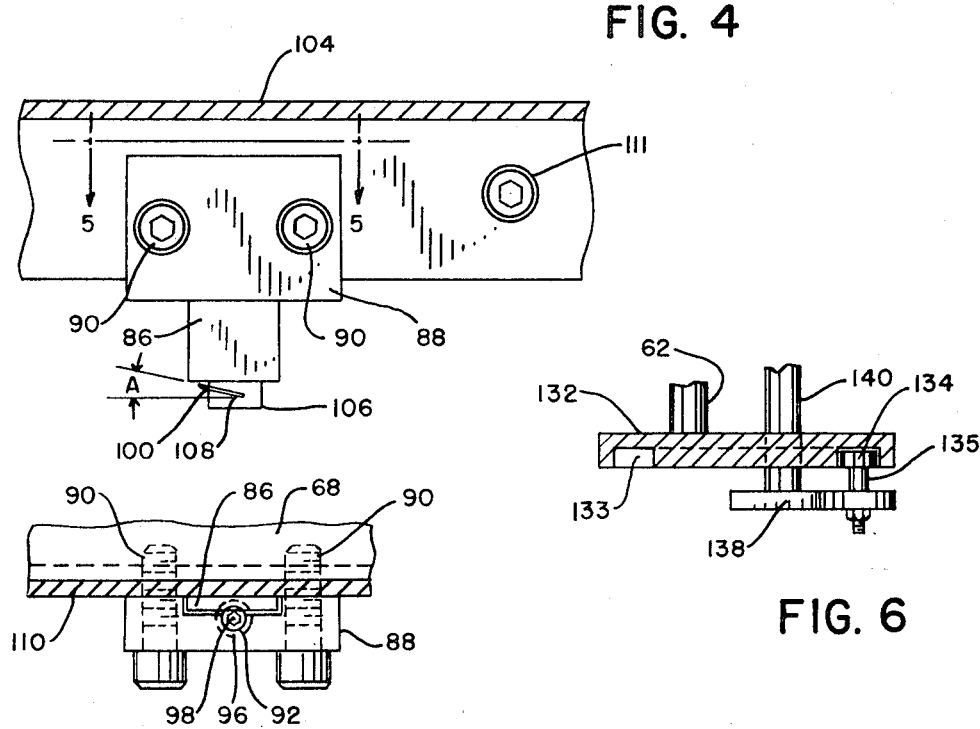
FIG. 4
FIG. 5
FIG. 6
INVENTOR
FRANCIS J. GRADY
BY Symmestvedt & Lechner
ATTORNEYS

CUTTING APPARATUS FOR EXTRUDED MATERIAL

BACKGROUND OF THE INVENTION

In the production of food products, such as pretzels, it has heretofore been known to employ apparatus including extruding heads incorporating dies with die orifices of the desired configuration, such as a pretzel configuration, and mechanism for the periodic severance of the dough as it is extruded. Such prior apparatus is exemplified by those disclosed in U.S. Pat. No. 2,660,131 issued Nov. 24, 1953, and U. S. Pat. No. 3,415,206 issued Dec. 10, 1968. However, various difficulties have been encountered with the prior machines, particularly in connection with the severing operation, it having been found that a clean severance of the extruded dough at high speeds and without distortion of the dough from the configuration imparted to it by the die orifice is virtually impossible.

SUMMARY OF THE INVENTION

A principal object of the instant invention is the provision of a severing mechanism for cooperation with an extrusion head suitably having a plurality of extrusion dies, the severing mechanism in association with a special shaping of the forward faces of the dies being adapted to sever the extruded material at high speeds and without deformation of the configuration imparted to the material by the die orifices.

Another object of the invention is provision of a severing mechanism fulfilling the foregoing object which permits the extrusion dies to be closely spaced relatively to one another whereby substantially greater production may be obtained than heretofore when employing an extrusion head of a given length.

The foregoing and other objects of this invention, which will become apparent, are attained by a severing apparatus hereinafter described in detail and which is adapted for incorporation in newly built extruding machines or as an attachment in substitution for the original severing mechanisms employed on existing machines. The extrusion machines may be of various types and may be employed for the production of various extruded products which may include other than edible products. However, for purposes of illustration, a machine for producing pretzel shapes or the like of unbaked dough will be described, it being understood, however, that the use of the invention is not limited to machines for this purpose.

In accordance with the invention, the die plates of the extrusion head are positioned in a row with their lower faces, i.e., the faces from which the extruded material projects, lying in a common plane. Each die plate may contain one or a plurality of die orifices, depending upon the size and configuration of the extruded product. The lower faces of the die plates are of slightly convex curvature in a direction transverse of the row of plates. A rack device supports a plurality of thin, flexible cutting blades mounted for reciprocatory movement longitudinally of the row of die plates, there being suitably one such blade for each die plate. The extent of movement of the blades is such that the cutting edge of each blade traverses the die orifice and may, particularly in the event the extruded dough shapes are relatively small, traverse a number of orifices.

The mounting means for the blades includes brackets supported by the rack, the brackets including means for adjustably positioning the cutting blades relatively to lower faces of the die plates. The mounting means also includes an adjustable spring tensioning device for exerting a desired longitudinal tension on each blade.

In one embodiment of the invention, the rack device is supported for a movement of the blades away from the lower faces of the die plate following completion of a cutting stroke and during the return stroke. In another embodiment of the invention, the cutting blades are maintained in contact with lower surfaces of the die plates at all times and the cutting operation is performed in both directions of reciprocation of the blades.

In setting up the mechanism for operation, the adjustment means for each blade previously referred to is set to bring the cutting edge or edges of the blade into contact with the convex surface of its associated die plate over the full transverse dimension thereof. Where the cutting operation is to be performed only during one direction of movement of the blades, the means for holding the blades positions them at a slight angle as, for example, an angle of 10° to the under face of the die plate. However, if cutting in both directions of reciprocation is desired, the holding means maintains the blade flat against the lower surfaces of the dies.

BRIEF DESCRIPTION OF THE DRAWINGS

FIG. 3 is a detailed sectional view on a further enlarged scale of the cutting mechanism shown in FIG. 2;

FIG. 4 is a side elevational view of the mechanism of FIG. 3 looking in the direction of the arrows 4—4 of FIG. 3;

FIG. 5 is a sectional view on an enlarged scale taken on the line 5—5 of FIG. 4 and looking in the direction indicated by the arrows; and FIG. 6 is a sectional view on an enlarged scale taken on the line 6—6 of FIG. 1 and looking in the direction indicated by the arrows.

DETAILED DESCRIPTION OF THE DRAWINGS

Figure 1:
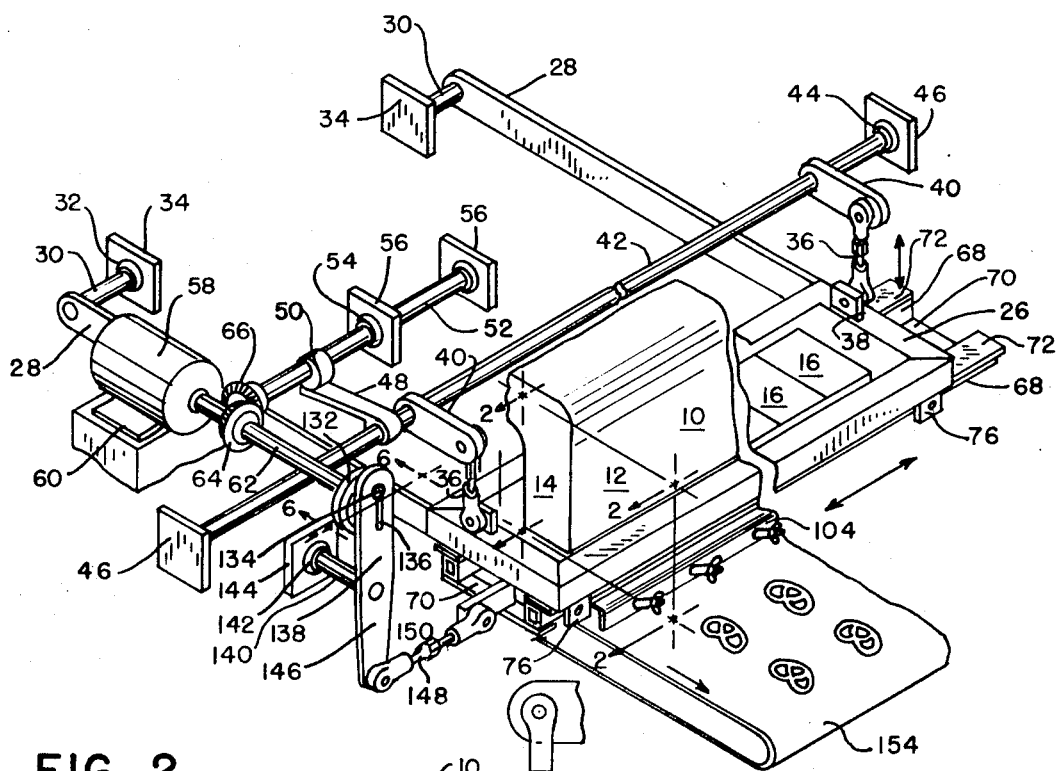
FIG. 1 is a perspective view, with parts broken away for clearness of illustration and with parts of the extruder not essential to an understanding of the invention omitted, of a dough-severing mechanism in accordance with the instant invention.
Figure 2:
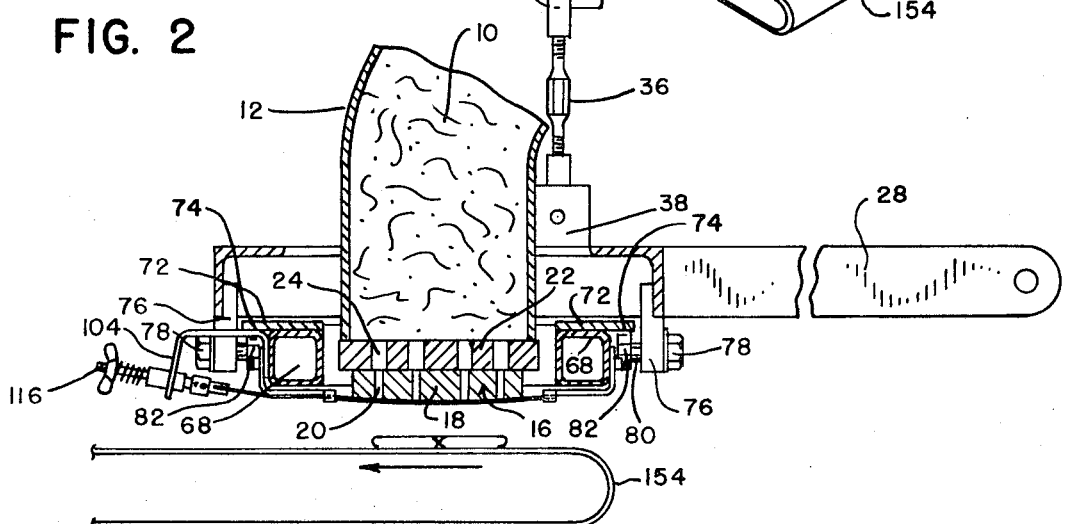
FIG. 2 is a sectional view on an enlarged scale taken on the line 2—2 of FIG. 1 and looking in the direction indicated by the arrows.

Referring particularly to FIGS. 1 and 2, a dough-extrusion and cutting apparatus incorporating the invention is illustrated, it being understood, however, that with respect to the dough-extrusion portion of the apparatus, only elements essential to an understanding of the invention have been included. The parts shown include a dough-receiving chamber 10 defined by side and end plates 12 and 14 respectively, the chamber terminating in a vertical portion adjacent the dough-extrusion head of the machine. A horizontal portion of the chamber leads from and is supported by a hopper (not shown) into which the dough is placed and then forced into the chamber by suitable means, such as screw conveyors (not shown). The lower end of the vertical portion of the chamber is closed by a die head comprised of a series of die units 16 secured in any suitable way to the walls of the chamber. The die units 16 may be of any known or otherwise desirable construction as, for example, of the constructions illustrated in either U.S. Pat. No. 2,660,131 or U.S. Pat. No. 3,415,206, previously referred to, except for one feature hereinafter pointed out. As illustrated, each die head comprises a lower product shaping die plate 18 having orifices 20 through which the dough is extruded in the desired configuration and an upper entrance plate 22 having cavities 24 through which the dough is fed to the shaping die plate 18. The exception, referred to above, to known constructions resides in the fact that the lower face of die plate 18 is convexly curved, as illustrated in FIG. 2, in a direction transverse to the line of dies, the extent of curvature being relatively minor, but contributing to the successful operation of the cutting mechanism hereinafter described. For example, the radius of curvature for the lower face of a die plate having a width of 4¼ inches is suitably 18 feet.

The dough-severing or cutting mechanism includes a rectangular frame member 26 suitably formed of angle irons welded together at their ends, the frame member being supported by rearwardly projecting arms 28 of substantial length and having their rear ends secured to pins 30 supported for rotational rocking movement in bearings 32 carried by fixed frame members 34. The rectangular frame member 26 is also supported by adjustable links 36 connected at one end to lugs 38 secured to the frame member as by welding or the like, the other ends of the links being connected to arms 40 fixed to and for rocking movement with a shaft 42. The shaft has its opposite ends supported by suitable bearing members 44 in fixed machine frame elements 46. The bearing member 44 for only one end of the shaft is illustrated in the drawings, but it will be understood that there is a comparable bearing at the other end of the shaft.

In the embodiment of the invention illustrated, shaft 42 is adapted to be rocked between positions in which cutting or severing blades, hereinafter to be described in detail and one of which is provided for each die plate, are maintained against the lower surfaces of their associated die plates for operation during a cutting stroke of the machine and a position in which they are remote from the die plates during a return stroke. The means for this purpose comprises a follower lever arm 48 fixed to shaft 42 and a cooperating cam 50 carried by a rotatable shaft 52 for rotation therewith, the shaft being supported by bearings 54 in fixed frame members 56. Shaft 52 is driven by a motor 58 supported on a mounting 60 through the medium of the motor shaft 62 and bevel gears 64 and 66.

The shearing or cut-off mechanism includes a rack device composed of a pair of hollow rails 68 extending longitudinally of the series of extrusion heads 16 on opposite sides thereof, as illustrated in FIG. 2, the hollow rails being connected together by plates 70 at their opposite ends, the plates suitably being welded to the rails. A strip or plate member 72 is secured, as by welding, to each of the rails 68. The strip member for each rail extends longitudinally thereof for the full length of the rail and includes an outwardly projecting, longitudinally extending lip portion 74.

The side members of frame 26 are provided with downwardly extending lugs 76 adjacent their opposite ends, the lugs being secured to the frame members by welding or other suitable means. Each of the lugs (see FIG. 2) carries a headed pin 78 fixed therein and having an inwardly extending shank portion 80 carrying a roller 82 for rotation thereon. As will be observed particularly from FIG. 2, rollers 82 contact the undersides of the lip portions 74 of plate or strip members 72 and thus provide the support means for rails 68 and the mechanism carried thereby and now to be described, while permitting longitudinal movement of the rails and such mechanism through cutting and return strokes.

The mechanism referred to above (see FIG. 3) comprises pairs of cutting-blade-supporting brackets 84, there being a pair for each cutting blade, the brackets being mounted on the rails 68. Referring particularly to FIGS. 3, 4 and 5, brackets 84 each include an upwardly extending arm 86. The brackets are supported for adjustment to a level to provide the desired contact of the cutting blade with its associated die during dough-severing strokes, as will be hereinafter more fully explained, by U-shaped members 88 secured to the outer sides of each rail as by studs 90, the parts being so dimensioned that the opening defined by each of the U-shaped members receives the upwardly extending portion 86 of its associated bracket with a sliding fit. The adjusting means for each bracket, which also serves to secure the bracket to the U-shaped member, consists of a threaded stud 92 received in a vertical threaded bore in the U-shaped member, the stud having an outwardly projecting collar 94. The upwardly extending arm of each bracket has a notch 96 receiving the collar 94 and the U-shaped member includes a recess 97 also receiving the collar, the upward extent of the recess defining the upward limit of adjustment.

The studs 92 are adapted to be rotated to achieve the desired adjustment by a suitable tool inserted in a tool-receiving socket 98 at one end of the stud. As will be noted, at the right hand side of FIG. 3, the socket 98 is shown at the lower end of the adjusting stud, as such lower end is available for cooperation with a wrench or other tool. However, at the left side of the construction, as viewed in FIG. 3, the socket for the reception of a wrench is placed at the opposite end of the adjusting stud due to the inaccessibility of the lower end of the stud because of the presence of a portion of a knife blade 100 directly therebelow, as shown in FIG. 3. To permit access to the socket 98 of the left-hand stud, suitable openings are provided in the elements of the device thereabove, as illustrated by the opening 102 in an elongated bracket 104 hereinafter to be described. A lug 106 is affixed, as by welding, to the inner end of each of the horizontal arms of brackets 84, each of the lugs including a slit 108 to snugly receive a knife blade 100.

Each blade 100 consists of a thin, flexible steel strip with a sharpened, beveled cutting edge, and has a width of the order of one-fourth inch and a thickness of the order of one sixty-fourth inch. The blade has one end secured against longitudinal movement out of the slit in the right-hand lug, as viewed in FIG. 3, by any suitable means, such as a pin 110 penetrating the blade and spanning the slit. The blade extends from the lug through the slit 108 in the lug 106 of the left-hand bracket, as viewed in FIG. 3, and to a blade-tensioning device indicated generally at 109. Tensioning device 109 is supported by elongated bracket 104 previously mentioned, which similarly supports the tensioning devices for the other blades of the series as illustrated in FIG. 1. The bracket has a vertically extending flange 113 at one side thereof secured to the adjacent rail 68, as by studs 111, and an outwardly and downwardly extending flange 112 at its other side. Each tensioning device 109 includes a housing 114 having an internal bore of square or other polygonal cross section, the housing penetrating an opening in flange 112 and being secured therein as by welding or the like. Housing 114 supports an element 116 having a shank portion 117 of the cross sectional configuration of the bore of the housing and a threaded portion 118 extending outwardly therefrom. A wing nut 120 is threaded onto the threaded portion of element 116 and a coil spring 122 is positioned between and confined by nut 120 and the other end of housing 114. The inner end of the shank portion 117 of element 116 is slotted as at 124 to receive the other end of blade 100, the blade end being suitably secured in the slot as by a pin 126 positioned in aligned openings in the end of the blade and in the shank portion 117 of element 116. A sleeve 127 is slidably mounted on shank portion 117, the sleeve having a longitudinal slot 128 receiving the end of a pin 130 projecting from the portion 117. Following the securing of the end of the knife blade by pin 126, the sleeve is shifted longitudinally to overlie pin 126 and prevent its unintentional displacement and consequent release of the blade.

In the embodiment of the invention described above in which the blades 100 are adapted to be moved away from the die faces during the return strokes, the slit 124 in pin 116 and the slits 108 in lugs 106 which receive the blade are preferably placed at an angle A to the horizontal, which angle may be of the order of 10°. The direction of the angularity of the slits is such that the forward or sharpened edge of the blade will, during a cutting stroke, be in contact with the lower face of its associated die member. However, as previously mentioned and as will hereinafter be more fully pointed out, the cutting mechanism of the invention may be employed to perform its cutting operation in both directions of reciprocation of the blades. In such event, the slits controlling the position of the knife blades are horizontal and the knife blades are sharpened by upwardly directed bevels at both edges.

Referring particularly to FIGS. 1 and 6, the reciprocation of the rack element and the associated knife blades through cutting and return strokes is provided by motor 58, previously referred to, in association with mechanism including a cam 132 mounted for rotation with motor shaft 62 and having a cam slot 133 receiving a cam follower roller 134 carried by a pin 135 mounted in a slot 136 in lever arm 138 which in turn is mounted for rocking movement with a shaft 140 supported in a suitable bearing 142 on a fixed frame member 144 of the machine. A downwardly projecting lower end 146 of lever 138 is connected by an adjustable link 148 to a lug 150 fixed to plate 70 connecting the ends of rails 68 at the adjacent side of the apparatus. Cam slot 133 is of a shape to maintain a uniform rate of movement of the cutting blades during the dough-severing operation. In FIG. 1, the rack element is shown in approximately the position it assumes upon the completion of the dough-cutting operation, but before the rack element has moved away from the die faces.

For the reception of the extruded and cut-off products, a conveyor 154, diagramatically illustrated in FIGS. 1 and 2, is mounted for traveling movement, as in the direction indicated by the arrows, by any suitable means (not shown), the conveyor underlying the series of dies. The upper reach of the conveyor is spaced relatively adjacent to the die and cutting mechanism to avoid distortion of the cut-off products as they fall by gravity onto the conveyor. The conveyor is adapted to carry the products to any suitable point for further processing.

As will be understood, the various parts of the apparatus described above are so dimensioned and proportioned that during a dough-severing stroke of the rack and associated knife blades, each blade will be moved from a position adjacent one edge of its associated die plate and out of the path of movement of dough through the die orifices to a position adjacent the opposite edge of the die plate and similarly out of the path of the movement of the dough. Also, the cam 50 carried by shaft 52 and which operates on lever 48 to rock shaft 42 and hence raise and lower frame 26 and its associated cutting elements is of such configuration that the cutting elements will not be lowered from their cutting contact with the surfaces of the die plates during at least that portion of their cutting strokes in which they cross the die plate orifices. Also, the configuration of the cam is such that the blades will be held out of contact with the surfaces of the die plates a sufficient distance to permit the dough to continue to extrude through the die orifices during the return stroke.

In preparation for the commercial operation of the machine, it is brought to the point in its cycle of operation in which the knife blades are in the dough-severing positions. The dough-severing mechanism as a whole is then moved by means of the adjustable links 36 to bring the cutting blades against the undersurface of the die plate. Each individual cutting blade is then adjusted to position its cutting edge in firm contact with the die face across at least that portion of the die face containing the die orifices. This is accomplished through the manipulation of studs 92 to bring the blade brackets 84 into their required positions, and the manipulation of wing nut 120 of the blade-tensioning device 109 to impart the required tension to the blade, both contributing to the achievement of this result.

In the operation of the machine for the production of extruded products of relatively intricate shapes, such as the pretzels shown on the conveyor in FIGS. 1 and 2, the embodiment of the invention in which the blades are sharpened at one edge only and are moved in contact with the die face during the cutting stroke and are held out of contact during the return stroke, is preferably employed. It has been found that the positioning of the blade at a slight angle to the die face, as is permitted by this construction, with only the sharpened edge in contact therewith, together with the adjustment of the blade to the exact curvature of the die face, insures against distortion of the shape of the product during the cutting operation. On the other hand, if products of less intricate shape are to be produced, the knife blade may be sharpened at both edges and held flat against the die plate whereby the cutting operation is performed in both directions of reciprocation of the blades. To convert the machine to an operation of this character, it is only necessary to employ die blades which are sharpened or beveled at both edges, employ lugs 106 with horizontal slots, disconnect bevel gear 66 from shaft 52 and adjust the shaft to bring the lobe of cam 50 opposite level arm 48 and hold it in this position. Alternatively to employing cam 50 and lever arm 48 to maintain the knife blades against the die faces, any other suitable means may be used.

Having thus described my invention in rather full detail, it will be understood that these details need not be strictly adhered to and that various changes and modifications may be made, all falling within the scope of the invention.

I claim:

1. A cutter mechanism and die for association with an extrusion apparatus in the production of units of extruded products in which said extrusion apparatus includes a die plate and means for feeding extrudable material to one side of said die plate for extrusion therethrough, said die plate having at its opposite side a face convexly curved in one direction, and said cutter mechanism comprising a thin, flexible blade having a sharpened cutting edge, means supporting said blade for movement along said face of said die plate in a cutting stroke in a direction transverse to said one direction, and means maintaining the cutting edge of said blade against said surface of said die during said cutting stroke.

2. A mechanism as defined in claim 1 wherein said supporting means for said blade also supports said blade for a return stroke following said cutting stroke and there is means cooperating with said supporting means to move said blade away from said die face during said return stroke.

3. A mechanism as defined in claim 1 wherein said supporting means includes a rack, there is means on said rack for attachment of the blade thereto, and there is means for adjustably positioning said attachment means to control the contact of said blade against said die face.

4. A mechanism as defined in claim 3 wherein said attaching means includes means for longitudinally tensioning said blade.

5. A mechanism as defined in claim 4 wherein said means for tensioning said blade includes means for adjusting the tension thereof.

6. A mechanism as defined in claim 1 wherein said die face has opposite edges and the means supporting said blade for movement across the die comprises a rack having a first bracket to which one end of the blade is secured adjacent one edge of said die face and a second bracket including means relatively remote from the other edge of said face to which the other end of said blade is secured and a guide bracket for said blade relatively adjacent said other edge of said face.

7. A mechanism as defined in claim 6 wherein said first bracket and said guide bracket include adjustment means for controlling the contact of the blade with said die face.

8. A mechanism as defined in claim 7 wherein said second bracket includes resilient means for tensioning said blade.

9. A mechanism as defined in claim 8 wherein said second bracket additionally includes means for adjusting the tension applied to said blade by said resilient tensioning means.

10. A mechanism as defined in claim 2 wherein there is means adapting said supporting means for movement in a vertical direction relatively to said die face and said means for moving said blade away from said die face comprises means for moving said supporting means in said direction.

11. A mechanism as defined in claim 10 wherein said means for moving said supporting means away from said die face comprises a pivoted lever arm and cam means for raising and lowering said lever arm.

12. A mechanism as defined in claim 1 wherein said means for supporting said blade for movement across said face in a cutting stroke supports said blade in a return stroke and there is means causing said cutting and return strokes of said blade, said last named means comprising a pivoted lever arm and cam means for operating said lever arm.

* * * * *